Figure 1:
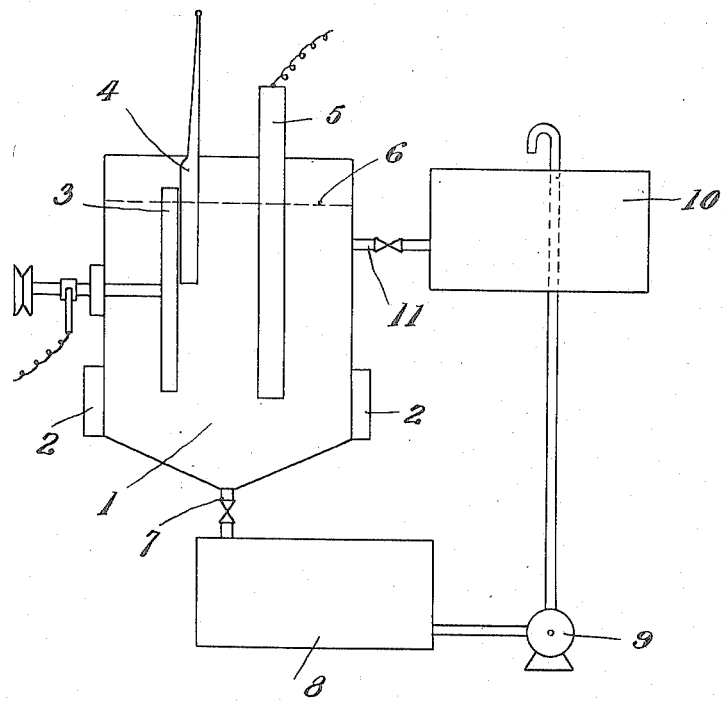

C. ELLIS.
ELECTROLYTIC HIGHER OXID OF MANGANESE DEPOLARIZING AGENT AND PROCESS OF MAKING SAME.
APPLICATION FILED DEC. 6, 1916.

1,322,000.

Patented Nov. 18, 1919.
2 SHEETS—SHEET 1.

Carleton Ellis    Inventor
By his Attorney
Henry D. Williams

UNITED STATES PATENT OFFICE.

CARLETON ELLIS, OF MONTCLAIR, NEW JERSEY, ASSIGNOR, BY MESNE ASSIGNMENTS, TO NATIONAL CARBON COMPANY, INC., OF CLEVELAND, OHIO, A CORPORATION OF NEW YORK.

ELECTROLYTIC HIGHER-OXID-OF-MANGANESE DEPOLARIZING AGENT AND PROCESS OF MAKING SAME.

1,322,000.  Specification of Letters Patent.  Patented Nov. 18, 1919.

Application filed December 6, 1916. Serial No. 135,407.

*To all whom it may concern:*

Be it known that I, CARLETON ELLIS, a citizen of the United States, residing at Montclair, in the county of Essex and State of New Jersey, have invented certain new and useful Improvements in Electrolytic Higher-Oxid-of-Manganese Depolarizing Agent and Processes of Making Same, of which the following is a specification.

This invention relates to a method of making manganese dioxid by the electrolytic oxidation of manganous compounds and to the product of such method and also relates to apparatus adapted to the production of this material.

The process as carried out in the preferred form makes possible the production of a higher oxid of manganese in the form of scales or flakes and having an unusual density and compactness, which in some cases, rather closely approaches that of the natural manganese dioxid or pyrolusite.

The process involves the exposure of a soluble manganous salt to the oxidizing action of electrolytic oxygen in a nascent condition as liberated at the anode and in the subsequent removal of the precipitate of, or containing manganese dioxid from solution in such a maner that reduction thereof by nascent hydrogen liberated at the cathode will not materially reduce the yield of the higher oxid of manganese material. Also when the manganese dioxid formed adheres rather closely to the anode, provision is made for its removal therefrom, preferably in a continuous manner.

The invention will be illustrated by an example of procedure which yields the product in its preferred form, that is to say, higher oxid of manganese material in the form of scales and possessing a relatively very dense character.

20 parts by weight of manganous sulfate, 20 parts of sodium sulfate and 200 parts of water were heated to 60–75° C. and an electric current from a six volt direct current generator was passed through this solution, using a lead anode and zinc cathode. A dark colored precipitate of manganese dioxid was formed in solution and another portion of a deeper color was deposited on the anode.

In another case 20 parts by weight each of manganous sulfate and sodium sulfate and 200 parts of water were subjected to a current of like voltage using a lead anode and carbon cathode at a temperature of from 60–80° C. Manganese dioxid was formed both in solution and on the anode. The solution was filtered from time to time to remove the manganese dioxid suspended therein and the anode was scraped or brushed to remove adherent higher oxid of manganese material which appeared in the form of dense scales or leaves. This leaf-like manganese dioxid is practically non-conducting from the standpoint of conductivity values employed in this art.

When mixed with graphite a good conducting mixture is obtained.

The electrolyte may be stirred by mechanical means during the operation and the manganese liquor constantly pumped from the same into a stirring device or filter and the clear liquor free from or practically free from traces of manganese dioxid is allowed to flow back to the electrolytic cell. The circulation of the electrolyte and continuous removal of manganese dioxid should be regulated to keep the liquid in the cell at approximately constant level. By the removal of manganese dioxid in this manner deleterious contact with the nascent hydrogen liberated at the cathode is substantially avoided. The lead anode may be made to rotate in contact with scrapers so that the scale or leaf-like dioxid is continuously formed and is continuously removed from the solution. The electrolyte may be strengthened as required. Besides the electrodes described other electrodes may be employed including masses of manganese dioxid, such as pyrolusite of a conducting character.

The apparatus comprised herein in the preferred form of the invention embraces an electrolytic cell preferably equipped with stirring means and having electrodes, one of which at least, is preferably rotatable and equipped with scrapers to remove manganese dioxid. Such electrolyte cell may be provided with a circulating device that continuously removes the liquor from the cell, filters and returns the clear filtrates to the cell for further electrolytic treatment.

Figure 2:
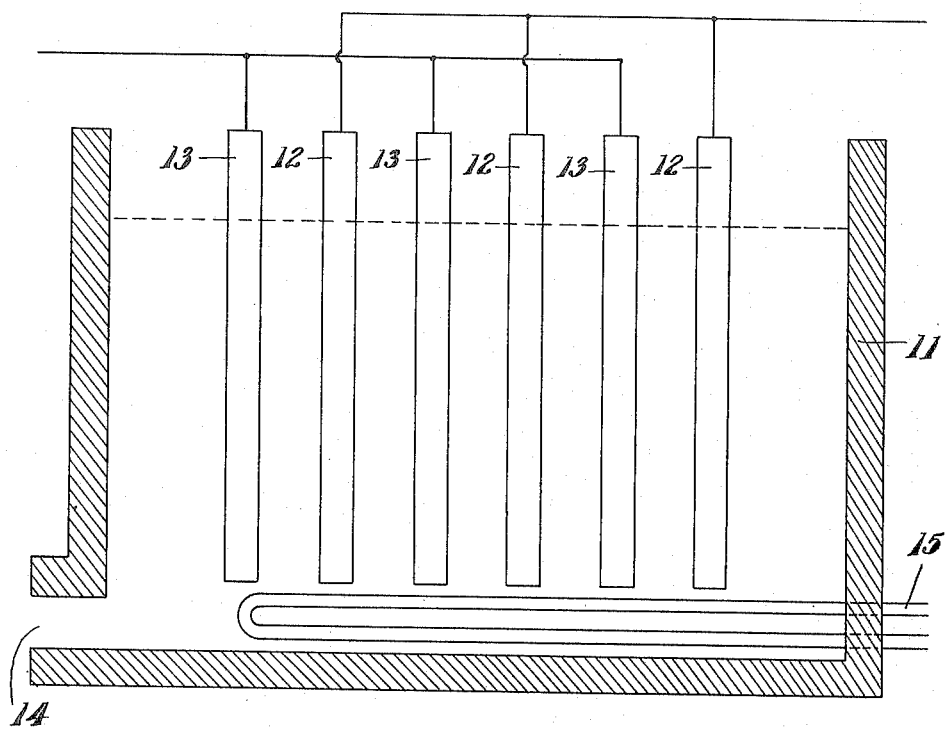

In the accompanying drawings, Figure 1 shows a vertical section of an electrolytic cell or chamber shown with accessories in vertical elevation. Fig. 2 shows another form of apparatus in which the invention can be carried out. In the drawing 1 is an electrolytic tank or chamber having a heating jacket 2 and a rotatable anode 3. 4 is a scraper pressing against the surface of the anode. 5 is an electrode serving as cathode. The level of the electrolyte is shown at 6. 7 is a draw-off pipe communicating with a filter 8. 9 is a rotary pump having a discharge pipe extending therefrom to the reservoir 10. 11 is a pipe connecting the electrolytic chamber 1 with the reservoir 10 serving to form a constant level of the electrolyte in the chamber 1. In the operation of this apparatus in carrying out the process of the present invention according to the details herein given for illustrative purposes, the electrolyte containing the manganous compound is placed in the chamber 1 and is heated by means of steam passed through the jacket 2. A current is sent through the cell from electrode to electrode and manganese dioxid or a higher oxid of manganese deposited on the anode 3, this is caused to rotate and the manganese dioxid is scraped off. The movement of the electrode, especially if rapid, serves to agitate the solution. The manganese dioxid settles slowly or rapidly according to conditions, such as the degree of agitation and is drawn off into the filter 8. Here it is collected while the electrolyte is withdrawn and forced by means of the pump 9 into the reservoir 10. To the latter container fresh electrolyte may be added, or simply the dry manganese salt which may be dissolved therein to duly strengthen the solution. The electrolyte passes back through the pipe 11 into the chamber 1 and the level of the liquid in the latter chamber is thereby maintained substantially constant.

Fig. 2 shows in section a simple form of electrolyzing apparatus which is not provided with stirrers. In the drawing 11 is a tank or receptacle open at the top and carrying the electrodes 12, 13, which may be of lead or graphite. The tank is provided with draw-off or drain 14. A steam coil 15 may be used to maintain the electrolyte at the proper temperature. A solution of manganese sulfate is placed in this tank, filling the latter to the level indicated. This solution may be added at the proper temperature may be raised to that point and there maintained by means of steam passed through the coil 15. A temperature of between 60 and 80° C. is preferably used with this type of apparatus. The manganese dioxid which forms collects on the electrodes and falls off from time to time or may be removed by means of a brush or scraper. When the electrolysis has proceeded sufficiently the solution is withdrawn and the manganese dioxid filtered therefrom. The filtrate may then be strengthened by the addition of manganese sulfate and returned to the electrolyzer.

In the electrolysis of a manganous salt to produce electrolytic manganese dioxid or other electrolytic forms of higher oxid of manganese, electrolytic manganites and the like, it is desirable to have present a second salt tending to improve the activity and regulate the electrolysis. When manganous sulfate is employed it is preferable to have a salt such as sodium sulfate which contains the sulfuric acid radical. Similarly with manganese chlorid, sodium chlorid may be used. It is preferable to have the electrolytic bath neutral or slightly acid as may be obtained by adding sulfuric or hydrochloric acid, preferably acidifying with an acid similar to that of the salt employed. As the manganese dioxid is thrown down from the solution the latter becomes more and more acid and neutralizing agents such as sodium carbonate or hydrate may be added to diminish the acidity as required.

A further desirable feature is that of heating the electrolyte during electrolysis to a temperature preferably of at least 60° and ranging from there up to the boiling point of the solution.

In admixing the electrolytic dioxid of a flaky or scale-like nature with graphite it is desirable to grind the manganese material to a fine powder when it may be readily mixed with graphite in any suitable proportion. Other forms of carbon may likewise be employed. The formation of manganese dioxid on the anode at a temperature approaching the boiling point enables what may be termed an electrically densified manganese dioxid to be produced. Individual scales of this material are more or less conducting of the electric current but a powder made therefrom normally is relatively but slightly conducting. The invention therefore comprises a conducting or relatively non-conducting higher oxid of manganese product such as an electrolytic manganese dioxid, electrolytic manganites and electrically densified products of similar chemical composition, preferably in the form of scales or leaves, which material is adapted for use in or as a depolarizing mass.

What I claim is:

1. The process of making manganese dioxid which comprises subjecting a solution of manganous sulfate and sodium sulfate to the action of an electric current and in collecting the manganese dioxid formed by oxidation.

2. The process of making manganese dioxid which comprises subjecting a solution comprising manganous sulfate and another compatible electrolyte of an inorganic saline character to the action of an electric current and in collecting the manganese dioxid formed by oxidation.

3. The process of making a higher oxid of manganese material suitable as a depolarizing agent, which comprises subjecting a solution of a manganous compound and alkali sulfate to the action of an electric current, whereby a higher oxid of manganese body is formed and in removing such body without material contact with nascent hydrogen.

4. The process of making a higher oxid of manganese material suitable as a depolarizing agent, which comprises subjecting a solution of a manganous sulfate and another sulfate to the action of an electric current, whereby a higher oxid of manganese compound is formed and in removing such compound without material contact with nascent hydrogen.

5. The process of making electrolytic higher oxid of manganese which comprises subjecting a hot solution containing a compound of a lower oxid of manganese to the action of an electric current producing anodic oxygen; whereby a higher oxid of manganese is formed and in substantially immediately removing the latter from the zone of electric action; whereby reduction by cathodic hydrogen is avoided.

6. The process of making manganese dioxid or similar higher oxid of manganese material specifically adapted for the requirements of a depolarizer in dry batteries which comprises subjecting a solution containing a soluble manganous compound and an inorganic saline body to electrolysis in aqueous solution and cooling the higher oxid of manganese formed by oxidation.

7. In the process of making higher oxid of manganese for depolarizing purposes the step which comprises collecting the higher oxid of manganese formed by electrolytic oxidation at a point remote from the zone of electric action, whereby contact with nascent hydrogen is avoided.

8. As a product adapted for use as a depolarizing agent electrolytic higher oxid of manganese.

9. The process of making electrolytic manganese dioxid which comprises subjecting a solution containing manganous sulfate at a temperature between 60 and 80° C. to an electric current.

10. The process of making electrolytic manganese dioxid which comprises subjecting a solution containing a soluble manganous salt at a temperature between 60 and 80° C. to an electric current.

11. The process of making manganese dioxid which comprises electrolyzing an aqueous solution containing manganous sulfate at a temperature above 60° C. and at a voltage not exceeding 6 volts whereby manganese dioxid is deposited on the anode, and in removing said deposits from said anode.

In testimony whereof I have affixed my signature.

CARLETON ELLIS.